(12) United States Patent
Busch

(10) Patent No.: US 8,767,070 B2
(45) Date of Patent: Jul. 1, 2014

(54) CONFIGURATION MODULE FOR A SURVEILLANCE SYSTEM, SURVEILLANCE SYSTEM, METHOD FOR CONFIGURING THE SURVEILLANCE SYSTEM, AND COMPUTER PROGRAM

(75) Inventor: Hans-Juergen Busch, Buechenbach (DE)

(73) Assignee: Robert Bosch GmbH, Stuttgart (DE)

( * ) Notice: Subject to any disclaimer, the term of this patent is extended or adjusted under 35 U.S.C. 154(b) by 748 days.

(21) Appl. No.: 12/670,453

(22) PCT Filed: Oct. 13, 2008

(86) PCT No.: PCT/EP2008/063731
§ 371 (c)(1),
(2), (4) Date: Jan. 25, 2010

(87) PCT Pub. No.: WO2009/071367
PCT Pub. Date: Jun. 11, 2009

(65) Prior Publication Data
US 2010/0194883 A1    Aug. 5, 2010

(30) Foreign Application Priority Data
Dec. 7, 2007    (DE) .......................... 10 2007 058 959

(51) Int. Cl.
*H04N 7/18* (2006.01)
*H04N 5/225* (2006.01)

(52) U.S. Cl.
USPC ........... 348/143; 348/141; 348/142; 348/161; 348/169

(58) Field of Classification Search
USPC .................................. 348/141, 143, 161, 169
See application file for complete search history.

(56) References Cited

U.S. PATENT DOCUMENTS

| | | | | |
|---|---|---|---|---|
| 6,570,608 | B1 * | 5/2003 | Tserng ........................... | 348/143 |
| 6,816,184 | B1 * | 11/2004 | Brill et al. ...................... | 348/143 |
| 2003/0058341 | A1 * | 3/2003 | Brodsky et al. ................ | 348/169 |
| 2005/0185823 | A1 * | 8/2005 | Brown et al. .................. | 382/103 |
| 2005/0271250 | A1 * | 12/2005 | Vallone et al. ................. | 382/103 |
| 2006/0028550 | A1 * | 2/2006 | Palmer et al. .................. | 348/155 |
| 2006/0074861 | A1 * | 4/2006 | Wilensky .......................... | 707/3 |
| 2006/0152584 | A1 * | 7/2006 | Wang et al. .................... | 348/143 |

FOREIGN PATENT DOCUMENTS

DE          102 52 731          5/2004

* cited by examiner

*Primary Examiner* — Rupal Dharia
*Assistant Examiner* — Joe Chacko
(74) *Attorney, Agent, or Firm* — Michael J. Striker

(57) ABSTRACT

A surveillance system (1) includes a configuration module (7) that defines object characteristic ranges, the configuration module including a selection device (10, 13) for interactive selection and/or confirmation of selection of an object (9) as a reference object (14), the object characteristic ranges being defined on the basis of the object characteristics of the reference object (14). The selection device includes a display device (13) on which the surveillance scene (12) containing the objects (9) is depicted in real time, and a human-machine interface to mark an object on the display device as the reference object. An object detector is programmed and/or electronically configured to detect moving objects in the surveillance scenes and to classify them as objects to be monitored on the basis of their object characteristics. The classification is performed by comparing the object characteristics of the object to the object characteristic ranges that form classification conditions.

9 Claims, 3 Drawing Sheets

CONFIGURATION MODULE FOR A SURVEILLANCE SYSTEM, SURVEILLANCE SYSTEM, METHOD FOR CONFIGURING THE SURVEILLANCE SYSTEM, AND COMPUTER PROGRAM

CROSS-REFERENCE

The invention described and claimed hereinbelow is also described in PCT/EP2008/063731, filed on Oct. 13, 2008 and DE 10 2007 058959.1, filed on Dec. 7, 2007. This German Patent Application, whose subject matter is incorporated here by reference, provides the basis for a claim of priority of invention under 35 U.S.C. 119 (a)-(d).

BACKGROUND INFORMATION

The present invention relates to a configuration module for a surveillance system, the surveillance system being designed to classify objects having object characteristics in a surveillance scene on the basis of object characteristic ranges as objects to be monitored, and in which the configuration module is designed to define the object characteristic ranges. The present invention likewise relates to a surveillance system comprising the configuration module, a configuration method, and a computer program.

Surveillance systems, e.g., video surveillance systems, are used to observe one or more surveillance regions, in which case surveillance cameras are directed to the surveillance region(s). The video images recorded by the surveillance cameras are often forwarded to a central unit, e.g., to a surveillance center, where they are evaluated by surveillance personnel or in an automated manner. Since video surveillance systems of this type often include a large number, e.g., 100 to 1000, of surveillance cameras, it is not possible for the large number of video images to be monitored in a reasonable manner by a limited number of surveillance personnel, and so automated image evaluation is becoming increasingly significant.

Publication DE 102 52 731 A1, which is the closest prior art, discloses a method for monitoring a scene using at least one imaging sensor. The method is characterized by the fact that only a selection of the data recorded by the imaging sensor is stored as relevant data, in order to simplify subsequent evaluation and to reduce the storage requirement. The selection is made by recognizing, based on object features, that an object in the recorded surveillance scene has undergone changes that are beyond a specified scope. This scope is determined via a specified difference from a specified value for a particular object feature. Possible object features referred to in this publication are gray value, texture, position, motion, and contour of the object.

SUMMARY OF THE INVENTION

The configuration module according to the present invention is designed and/or suitable for a surveillance system, the surveillance system preferably being designed as an optical surveillance system, in particular a video surveillance system, and/or a surveillance system that is supported by other sensors, such as motion alarms, microphones, IR cameras, etc.

The surveillance system is realized in such a manner that it may classify or reject objects in a surveillance scene as objects to be monitored on the basis of their object characteristics by performing a comparison with object characteristic ranges, e.g., object characteristics having tolerances, or with a plurality of discrete object characteristics. In particular, a check is carried out to determine whether an object characteristic is located within an object characteristic range or if it forms a portion thereof. The surveillance objects therefore form a selection of the objects in the surveillance scene. The objects may have any design, e.g., they may be pedestrians, animals, traffic objects, automobiles, trucks, aircraft, helicopters, boats, etc. The object properties are used to classify the objects and may likewise have any design; preferred examples are explained below.

The surveillance scene is the depiction of a real surveillance region, which is created by the surveillance system and is used for surveillance purposes, e.g., the surveillance scene is realized as a video image or a partial video image. The configuration module is designed to define the object characteristic ranges, in particular the requirement and/or input.

According to the present invention it is provided that the configuration module includes a selection device, using which an object may be selected via user interaction. As an option, the selection may also be limited to confirming a proposed selection of the configuration module. Via the selection that is made, the object is marked as a reference object. The configuration module and/or the selection device are/is programmed and/or electronically configured to define the object characteristic ranges on the basis of, and/or using the object characteristics of the reference object. The object characteristics of the reference object therefore form a starting point or a basis for defining the object characteristic ranges.

An idea behind the present invention is to simplify the configuration of the surveillance system, in particular of an object detector in the surveillance system. Instead of entering a numerical value or the like for the object characteristic ranges, for instance, the user merely selects an object that is similar to the object to be eventually monitored, e.g., on a video image, and selects its object characteristics as the basis for the object characteristic ranges. The present invention therefore implements a sample-object based or reference-object based configuration of the surveillance system, in particular of the object detector. As an option, the object characteristics are supplemented with tolerance ranges or variations in order to form the object characteristic ranges. This supplementation may take place automatically via the configuration module, or interactively via the user.

In a preferred embodiment of the present invention, the selection device includes a display device on which the surveillance scene and the objects are depictable or are depicted. The object to be marked as the reference object is selected, e.g., using a human-machine interface such as a mouse, a touchpad, or the like.

It is also within the scope of the present invention for a plurality of objects to be selected as reference objects, and for their object characteristics to be averaged, for instance, or summarized in another manner, in order to form a basis for the object characteristic ranges. It is also possible, for instance, for a large number of objects to be marked as reference objects, and for the tolerances and variations of the object characteristics to be determined or proposed on the basis of statistical methods when the object characteristic ranges are formed.

In a preferred embodiment of the present invention, the selectable objects are depicted in the display device as having been marked. It is feasible, for instance, for objects recognized in the video image to be automatically framed. This embodiment makes it easier for the user to make an interactive selection.

In a preferred development of the present invention, the configuration module includes an input device which is designed for use to adjust the object characteristic ranges. In addition to acquiring the object characteristic ranges directly from one or more reference objects, it is therefore proposed that an additional opportunity to enter a selection be provided, as an option, via which the user may interactively change and/or define the object characteristic ranges.

Particularly preferably, the input device is designed to define tolerances of object characteristics, and the object characteristic ranges are defined by the object characteristics together with the tolerances. The tolerances may be described in a manner that is easy for the user to understand, e.g., "0 . . . 100" or "exactly . . . approximately", or "less than . . . greater than", or the like. In this manner, the user may easily enter the tolerances in the configuration module without having to deal with abstract values.

It is likewise preferable to limit the user to entering only one tolerance value per object characteristic. Experience has shown that, when more opportunities to enter settings are utilized, the accuracy of the settings for the object characteristic ranges is improved, but the quality of the settings becomes worse, due to incorrect settings being entered. In a "one entry" mode, at the least, the user is limited to entering one tolerance value/object characteristic.

Particularly preferably, the method for entering the tolerance value(s) is presented graphically, e.g., as a sliding regulator, a rotary regulator, or the like. This embodiment likewise enables the user to more easily adjust the object characteristic ranges.

As mentioned initially, the object characteristics may relate to every classifiable characteristic of the object. Preferred object characteristics relate to position or motion, i.e., the evaluation of the position, velocity, and/or acceleration vectors of the objects, in order to define object characteristic ranges in terms of position, velocity, acceleration, and/or direction of motion. An additional possibility is to determine the distance to a further point or to another moving or stationary object in the surveillance scene.

Further object characteristics relate to object features such as size, the size ratio of width and height of the object, in particular in the perspective shown, and/or the area of the object. Using these object characteristics, it is possible, e.g., to distinguish pedestrians and vehicles.

Even further object characteristics relate to surface characteristics of the object, in particular the color and/or gray value, and/or the texture of the object. In the case of complex object characteristics in particular, such as the texture or color value, the object characteristic ranges of which are difficult to set using a single numerical value, an algorithm or a rule system is installed downstream in the configuration module and implements the tolerance value that was selected in a one-dimensional or multi-dimensional object characteristic range.

A further subject matter of the present invention relates to a surveillance system which includes the configuration module, according to one of the preceding claims, and/or as described above. The surveillance system is designed to be linked via signals to a plurality of surveillance sensors, it being possible for the surveillance sensors to be designed as imaging sensors, in particular as video cameras, motion alarms, microphones, etc.

A further subject matter of the present invention relates to a method for configuring a or the surveillance system, in which a user selects and/or confirms an object in a surveillance scene as the reference object, and in which object characteristic ranges are defined for a subsequent object classification on the basis of and/or using the object characteristics of the reference object. The method is preferably carried out during initialization, i.e., before the surveillance operation of the surveillance system is activated.

BRIEF DESCRIPTION OF THE DRAWINGS

Further features, advantages, and effects of the present invention result from the description that follows of a preferred embodiment of the present invention, and from the attached figures.

DETAILED DESCRIPTION OF THE PREFERRED EMBODIMENT(S)

Figure 1:
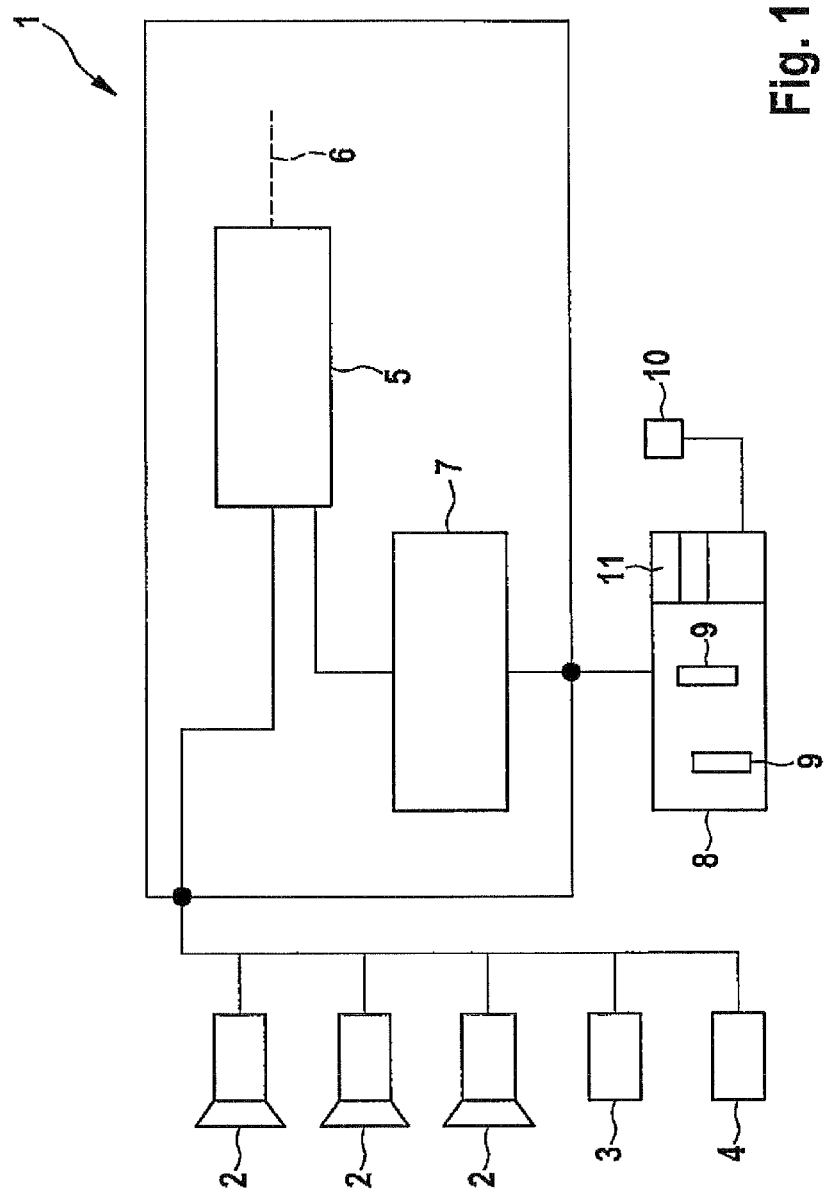
FIG. 1 shows a schematic block diagram of a surveillance system, as an embodiment of the present invention.

FIG. 1 shows, in a schematicized block diagram, a surveillance system 1 as an embodiment of the present invention, which is connected via signals to a plurality of surveillance cameras 2, and as an alternative or in addition thereto, to other sensors 3, in particular motion alarms, and/or storage devices 4. Surveillance cameras 2 or sensors 3 are situated and/or designed to monitor surveillance regions, such as public spaces, schools, train stations, intersections, etc. The surveillance regions are imaged by surveillance cameras 2 and sensors 3, and they are made available to surveillance system 1 in the form of surveillance scenes. Memory devices 4 are used for the temporary and/or permanent storage of the signals from surveillance cameras 2 and/or sensors 3.

Surveillance system 1 includes an object detector 5 which is programmed and/or electronically configured to detect and/or track objects, in particular moving objects, in the surveillance scenes, and to classify them as objects to be monitored on the basis of their object characteristics. The classification is performed by comparing the object characteristics of the object to object characteristic ranges that form classification conditions. As soon as an object is classified as an object to be monitored, it is tracked depending on the further design of surveillance system 1, and its information or data are stored, an alarm is activated, etc. These possible reactions of object detector 5 are indicated via dashed line 6.

To define, and in particular, to generate the object characteristic ranges, surveillance system 1 includes a configuration module 7 that makes it possible to define object characteristic ranges in a semi-automated and/or interactive manner. Configuration module 7 is connected via signals to a display device 8, such as a monitor, and one of the surveillance scenes containing objects 9 is depicted or depictable on display device 8. To make objects 9 easier to recognize, they may be indicated in a graphic manner, e.g., by framing them, or using a color marking. The surveillance scene shown in display device 8 may represent one of the surveillance regions detected by surveillance cameras 2 in real time, or it may be a surveillance scene stored in storage device 4.

Using a human-machine interface (HMI) 10, the user interactively selects one or more of the objects 9 as reference objects. For example, the user "click" objects 9 to be selected. Configuration module 7 derives the object characteristic ranges on the basis of selected object(s) 9 which will be handled further as reference objects by configuration module 7.

In one possible alternative, the object characteristic ranges are determined automatically, e.g., in that a plurality of reference objects is selected, and the object characteristic ranges are determined via statistical evaluation.

A further possibility, e.g., in the case of a selected reference object, is to provide the object characteristics of the reference object with specified tolerances; the object characteristics, combined with the tolerances, form the object characteristic ranges.

In a third possibility, an input device 11 is connected via signals to configuration module 7; input device 11 makes it possible for tolerances and range widths of the object characteristic ranges to be entered manually. The object characteristic ranges are then transferred to configuration module 7 on the basis of the object characteristics of the reference object(s), and together with the tolerances and/or range widths which were entered interactively.

The object characteristics relate, e.g., to all or a selection of statistical parameters of the objects, such as size, velocity, direction of motion, and/or color of the object. Input device 11 displays a mean result value and a tolerance and/or a tolerance value for each object characteristic. This tolerance value may be adapted interactively or manually, e.g., using a virtual sliding regulator. In this manner, the user may easily control the weighting of the parameters when performing a search. The parameters for the object comparisons are derived from the result and tolerance values, and are used to search the data in storage device 4 or in the data streams of surveillance cameras 2 or sensors 3. Analogously, configuration module 7 may also be used to configure other sensors, e.g., intelligent motion alarms.

Figure 2:
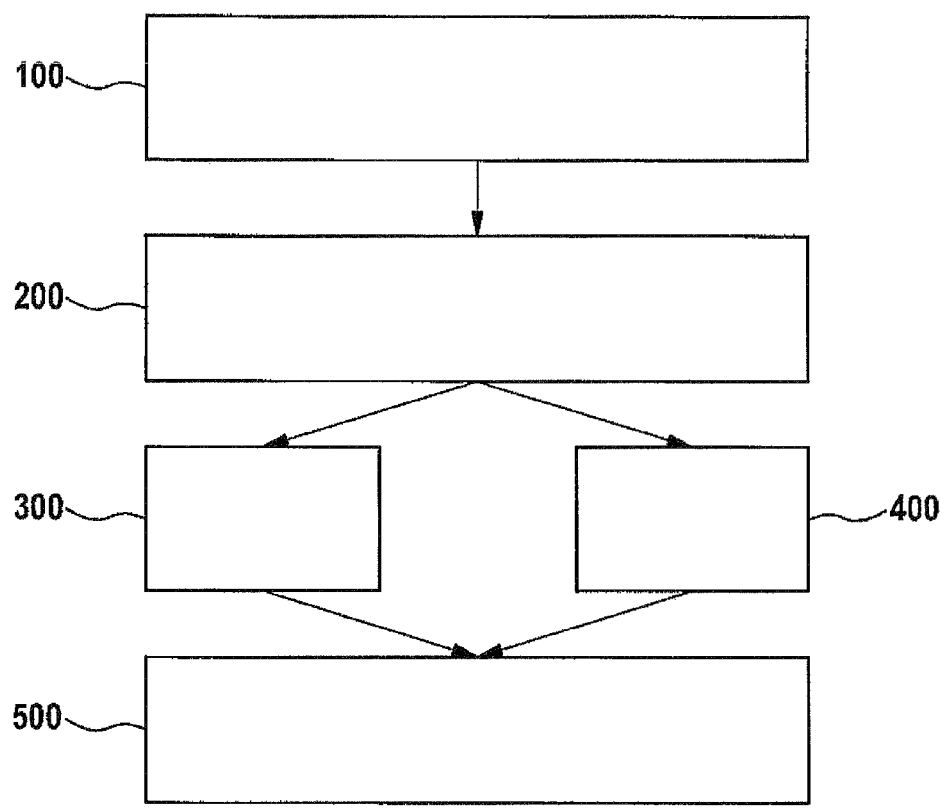
FIG. 2 shows a flow chart, as an embodiment of the method according to the present invention.

FIG. 2 shows a schematic flow chart of one possible sequence of steps for surveillance system 1 depicted in FIG. 1, as an embodiment of the method according to the present invention, which may be carried out in particular on surveillance system 1.

In a first step 100, objects in the surveillance scene are displayed in display device 8, and they are offered to the user for selection. In a second step 200, the user interactively and/or manually selects at least one of the displayed objects as a reference object.

Depending on the operating mode of surveillance system 1, in a first possibility, tolerances are set in an automated manner on the basis of the object characteristic values of the reference object(s), and object characteristic ranges are formed on the basis of the object characteristic values and the tolerances. In a further operating mode, the user interactively sets the tolerances or range widths using input device 11. The tolerances that are set may be depicted graphically in display device 8, as a working aid, e.g., one tolerance of the object size may be easily visualized. After the tolerances or range widths are entered manually or automatically in step 300 or step 400, respectively, the object characteristic ranges are transferred to object detector 5 which searches, in a step 500, the on-line or off-line data for objects that have object characteristics that lie within the object characteristic ranges. These objects are classified and handled further as objects to be monitored.

Figure 3:
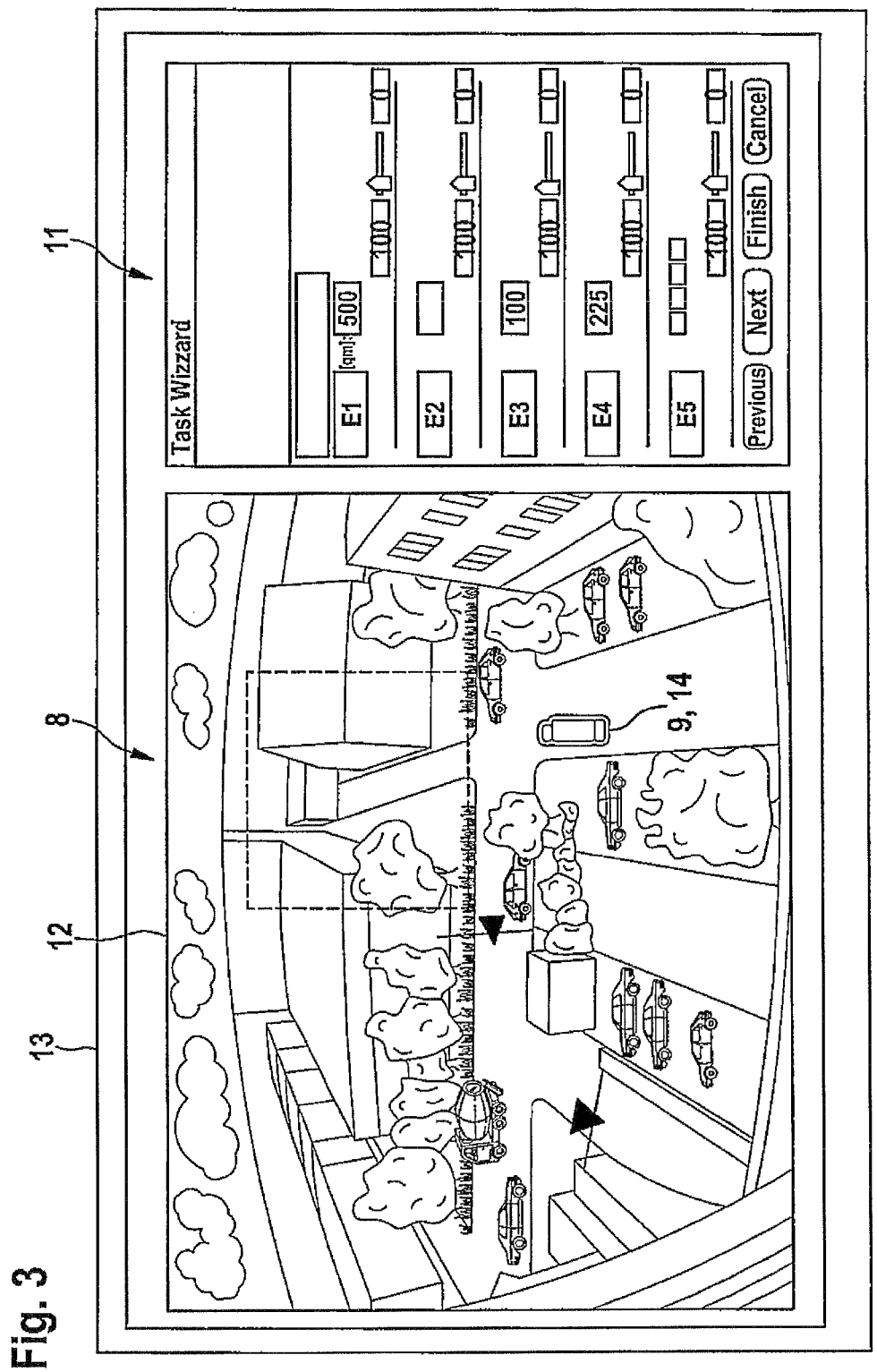
FIG. 3 shows a schematicized screen view to illustrate the embodiments.

FIG. 3 shows a possible embodiment of display device 8 and input device 11 depicted in FIG. 1, both of which are visualized on monitor 13. A surveillance scene 12 containing objects 9 is shown on the left side. After an object 9 is selected as a reference object 14, a menu field is displayed, as input device 11, on the right side of monitor 13 for use to interactively enter the tolerances and/or range widths. The menu field displays a mean value or the current value of object characteristics E1, E2, E3 and E4 of selected reference object 14. The object characteristic values are depicted, e.g., numerically or symbolically, or using color.

In an embodiment presented as an example, the object characteristics are assigned as follows:
E1: Object size or area
E2: Ratio of height to width of the object (aspect ratio)
E3: Velocity of the object in [km/h]
E4: Direction in which the object (9) is moving, in [°]
E5: Color of the object For each object characteristic, input device 11 displays a sliding regulator 13, using which the tolerance or range width may be interactively adjusted between 0 (exactly) and 100 (approximately) for every object characteristic. It is also possible to deactivate object characteristics, or to add other object characteristics. Once the entry has been confirmed, the mean or the actual value of the object characteristic is converted, together with the tolerances or range widths, into object characteristic ranges which are then transferred to object detector 5 as a condition for the classification of an object 9 as an object to be monitored.

What is claimed is:

1. A surveillance system (1), the surveillance system (1) being designed to classify objects (9) that have object characteristics in a surveillance scene (12) on the basis of object characteristic ranges as objects to be monitored, and being linked via signals to a plurality of surveillance sensors being formed as video cameras, the surveillance system comprising:
a configuration module (7) being designed to define the object characteristic ranges, wherein the configuration module comprises a selection device (10, 13) for interactive selection and/or confirmation of selection of an object (9) as a reference object (14), the object characteristic ranges being defined on the basis of and/or using the object characteristics of the reference object (14),
wherein the selection device includes a display device (13) on which the surveillance scene (12) containing the objects (9) is depicted in real time, and a human-machine interface to mark an object on the display device as the reference object, wherein said object is selected by clicking on said object;
an object detector which is programmed and/or electronically configured to detect moving objects in the surveillance scenes and to classify them as objects to be monitored on the basis of their object characteristics, wherein the classification is performed by comparing the object characteristics of the object to the object characteristic ranges that form classification conditions,
wherein the object detector is programmed and/or electronically configured to track the moving object as soon as it is classified as the object to be monitored, and wherein the object characteristics ranges and one or all of the tolerances and the tolerance values are visualized in the display device (13).

2. The surveillance system as recited in claim 1, wherein selectable objects (9) are depicted in the display device (13) as having been marked.

3. The surveillance system as recited in claim 1, further comprising an input device (11) which is designed for use to enter a setting for the object characteristic ranges.

4. The surveillance system as recited in claim 3, wherein the input device (11) is designed to define tolerances of object characteristics; the object characteristics and the tolerances define the object characteristic ranges.

5. The surveillance system as recited in claim 3, wherein the input device (11) is designed for the input of a single tolerance value per object characteristic.

6. The surveillance system as recited in claim 5, wherein the input device (11) is designed to visually depict the tolerance or the tolerance value.

7. The surveillance system as recited in claim 1, wherein the object characteristics include one, a few, or all of the following characteristics:
- the position of the object (9),
- the velocity of the object (9),
- the direction in which the object (9) is moving,
- the distance between the object (9) and another object,
- the surface of the object (9),
- the size or aspect ratio of the object (9),
- the gray value of the object (9),
- the color value of the object (9),
- the texture of the object (9).

8. A method for configuring a surveillance system (1), as recited in claim 1, the surveillance system (1) being designed to classify objects (9) having object characteristics in a surveillance scene (12) on the basis of object characteristic ranges as objects to be monitored, in which an object (9) in a surveillance scene (12) is selected interactively and/or manually as the reference object (14), and object characteristic ranges are defined on the basis of and/or using the object characteristics of the reference object (14).

9. A non-transitory computer readable medium containing a computer program comprising program code means for carrying out all steps of the method as recited in claim 8 when the program is run on a computer and/or a device as recited in claim 1.

* * * * *